UNITED STATES PATENT OFFICE 2,163,200

MALT-ENZYME EXTRACTION IN BEER MAKING

Eberhard Heimann, Berlin-Schoneberg, Germany

No Drawing. Application March 4, 1937, Serial No. 129,098. In Switzerland March 4, 1936

7 Claims. (Cl. 99—43)

The object of this invention is a process for the production as a by-product in the manufacture of beer of malt enzymes, particularly diastase or highly active diastase preparations, which are admirably adapted for a number of purposes of application, for example in the baking industry, and above all in the textile industry and pharmacy. The object of the invention is further a malt-enzyme preparation.

According to the process of this invention malt mash or liquid separated therefrom by settling is treated with substances having an adsorbing action, and the malt enzymes (diastase) are thereby combined with the added substances. The resulting adsorption product is separated from the mash or liquid. In a second operation the substances containing the enzymes in an adsorbed condition are treated with extracting agents. The extract which amounts to only a small fraction of the liquid separated out above the mash, the so-called cold yeast (in German "kalter Satz"), may thereafter be subjected to evaporation, preferably in vacuo, in order to produce a highly active enzyme- or diastase-preparation.

It is known per se that diastase is contained in relatively large surplus quantities in brewing malt. The liquid disposed above the thick mash after settling has also already been entirely or partially removed and diastase-containing malt extracts obtained therefrom by evaporation in vacuo. This process however possesses the disadvantage that extraordinarily large quantities of water must be used for evaporation, which considerably impairs the economy of the process, apart from the fact that only preparations having relatively small activity can be produced. This known process moreover possesses the further disadvantage for the manufacture of beer that valuable malt constituents are also removed together with the cold yeast.

These disadvantages are entirely overcome in the process of this invention. It is for example possible without difficulty to obtain diastase-containing extracts of such concentrations, that only one tenth and less of water has to be evaporated as compared with the above described known process.

The enzyme preparations obtained according to this invention are further distinguished by their very high diastatic action, which amounts up to ten times and more that of the preparations obtained according to the known process.

Finally in the process of this invention the malt mash or the removed cold yeast is practically unaltered with regard to its content of valuable malt constituents and in addition to enzymes (diastase), substances are on the other hand also removed which impart to the beer an unpleasant color and the characteristic new-beer taste, etc., give rise to the feared turbidities on pasteurization and also fix active hop constituents. The process of this invention accordingly also provides the possibility of introducing the production of diastase into the process of beer manufacture, i. e. of obtaining a product hitherto intentionally avoided in the process of boiling the mash, without the quality of the beer being impaired in any degree, but on the contrary even an improvement in quality being achieved. Only the enzymes and constituents which have been found to be undesirable in the beer, are removed; the extractive matters remain in the beer.

The adsorption agent is introduced in a fine form by stirring in and is thereafter allowed to settle, centrifuged or filtered or alternatively the mixture is filtered through granular adsorption material.

The most varied adsorbing substances, for example silica gel, animal charcoal and colloidal metal hydroxides, are suitable for the treatment of the mash or the cold yeast removed from the mash. Aluminium silicates of the Montmorillonite type, which are distinguished by their special activity, are particularly suitable. These aluminium silicates are abundantly available in bleaching earths and fuller's earth.

The aforesaid aluminium silicates may be employed in a crude form, preferably after previous preparation with the object of removing granular ballast materials. They may however also be used in an activated form, such as is obtained by treatment with acids, for example mineral acids, and/or by electrostatic means. It is advisable to subject the aluminium silicates to a heat treatment within the temperature range of from 500 to 800° C., since in this manner highly active products can be obtained which can be easily separated from the liquid. Before or after the heat treatment the aluminium silicates may be converted into a relatively fine or coarse grained condition, which is accompanied by the particular advantage that, when using the adsorbing substances as filter bed for the liquid under treatment, filtration proceeds rapidly and smoothly. By suitably selecting the degree of granulation it is possible to adjust the speed of filtration exactly to any individual requirement. In most cases a short filtration period is entirely sufficient for treating the liquid with the adsorption agents.

Aluminium silicates, such as bentonite, which contain large proportions of colloidally fine particles, may also be used for the process of this invention.

The adsorption action of any kind of aluminium silicate of the Montmorillonite type may be considerably increased by exhaustive treatment with acids, for example strong mineral acid, i. e. a treatment until substantially all the soluble bases have been entirely removed. In this connection it may be mentioned that the known acid treatment of bleaching earths and the like prior to their use as bleaching agents as commonly employed to bleach or purify oils was only of relatively short duration, since an exhaustive acid treatment yields a product which cannot be used for the purification of oil. The fact that their plasticity is lost in the exhaustive acid treatment is immaterial.

The aluminium silicates which have been exhaustively treated with acid according to the invention may also be subjected before or after the acid treatment to a heat treatment at 500 to 800° C.

The conversion of the mass into a coarsely granular condition must however be effected before the acid treatment since, as mentioned above, the acid treatment results in a loss of plasticity.

Finally it should also be mentioned that mixtures of the most varied kinds of the above mentioned adsorption agents may of course also be employed.

The adsorption agents retain their activity for a practically unlimited time when carrying out the process of the invention. They may accordingly be constantly again used after the removal of the diastase or the malt enzymes together with the extraction agents for the treatment of fresh quantities of mash or liquid withdrawn therefrom. The treated cold yeast is returned to the mash for the purpose of manufacturing beer or malt preparations. The extracted adsorption agent is if necessary again treated with acid, i. e. weakly acidified, before being re-employed.

The following example serves to illustrate the manner in which the process of the present invention may be carried out.

*Example*

1000 kgms. of cold yeast separated from malt mash are filtered through a filter bed of granular bleaching earth heated at 500 to 800° C. and thereafter exhaustively treated with 10 to 15% hydrochloric acid. (Before filtration the cold yeast may be centrifuged.)

The filter bed is thereafter treated with ammonia-containing water and in this way 100 kgms. of extract are obtained, which contains practically the entire quantity of the diastase or malt enzymes originally contained in the cold yeast.

By evaporating the extract in vacuo 10 kgms. of a malt extract having an extraordinarily high diastatic action are obtained.

Other alkalies or alkali salts of weak acids, for example sodium acetate, may be used in place of ammonia for the extraction.

The extracted filter bed after acidification can again be directly used for the treatment of further quantities of cold yeast.

The treated cold yeast is returned to the mash and the latter is further worked up in the usual manner into beer.

The process of this invention accordingly provides the following chief advantages: The diastase (malt enzymes) is obtained free from excess of malt extractive materials. These remain behind in the beer. The beer itself is however freed from certain detrimental substances. The economy achieved in the process of concentration is particularly important.

I claim:

1. A process for the preparation of malt enzymes as a by-product in the manufacture of beer, comprising treating a liquid obtained by mashing malt with at least one aluminum silicate to adsorb the malt enzymes contained in such liquid, separating the resulting liquid from the said aluminum silicate containing the adsorbtively bound malt enzymes, and extracting the malt enzymes from the aluminum silicate.

2. A process for the preparation of malt enzymes as a by-product in the manufacture of beer, comprising treating a liquid obtained by mashing malt with at least one aluminum silicate to adsorb the malt enzymes contained in such liquid, separating the resulting liquid from the said aluminum silicate containing the adsorbtively bound malt enzymes, and extracting the malt enzymes from the aluminum silicate with extracting agents having weakly alkaline action.

3. A process for the preparation of malt enzymes as a by-product in the manufacture of beer, comprising separating a liquid from malt mash by settling, treating such liquid with at least one aluminum silicate to adsorb the malt enzymes contained in such liquid, separating the resulting liquid from the said aluminum silicate containing the adsorbtively bound malt enzymes, extracting the malt enzymes from the aluminum silicate with aqueous extracting agents having weakly alkaline action, and evaporating the resulting extract.

4. A process for the preparation of beer and enzymes, comprising treating liquid obtained by mashing malt with at least one aluminum silicate to adsorb the malt enzymes contained in such liquid, separating the resulting liquid from the aluminum silicate containing the adsorbtively bound malt enzymes, extracting the malt enzymes from the aluminum silicate, adding the liquid separated from the aluminum silicate to a mash, and further treating said mash for the manufacture of beer.

5. A process as claimed in claim 1 in which said aluminum silicate is of the Montmorillonite type and contains a high proportion of colloidally fine particles.

6. A process as claimed in claim 1 in which said aluminum silicate is bentonite.

7. A process for the preparation of malt enzymes as a by-product in the manufacture of beer, comprising filtering a liquid obtained by mashing malt through a filter bed containing at least one aluminum silicate to adsorb the malt enzymes contained in such liquid, separating the resulting liquid from the said aluminum silicate containing the adsorbtively bound malt enzymes, and extracting the malt enzymes from the aluminum silicate.

EBERHARD HEIMANN.